E. R. HAMPTON.
AUTOMOBILE EMERGENCY BRAKE LEVER LOCK.
APPLICATION FILED NOV. 30, 1915.
1,202,382.   Patented Oct. 24, 1916.
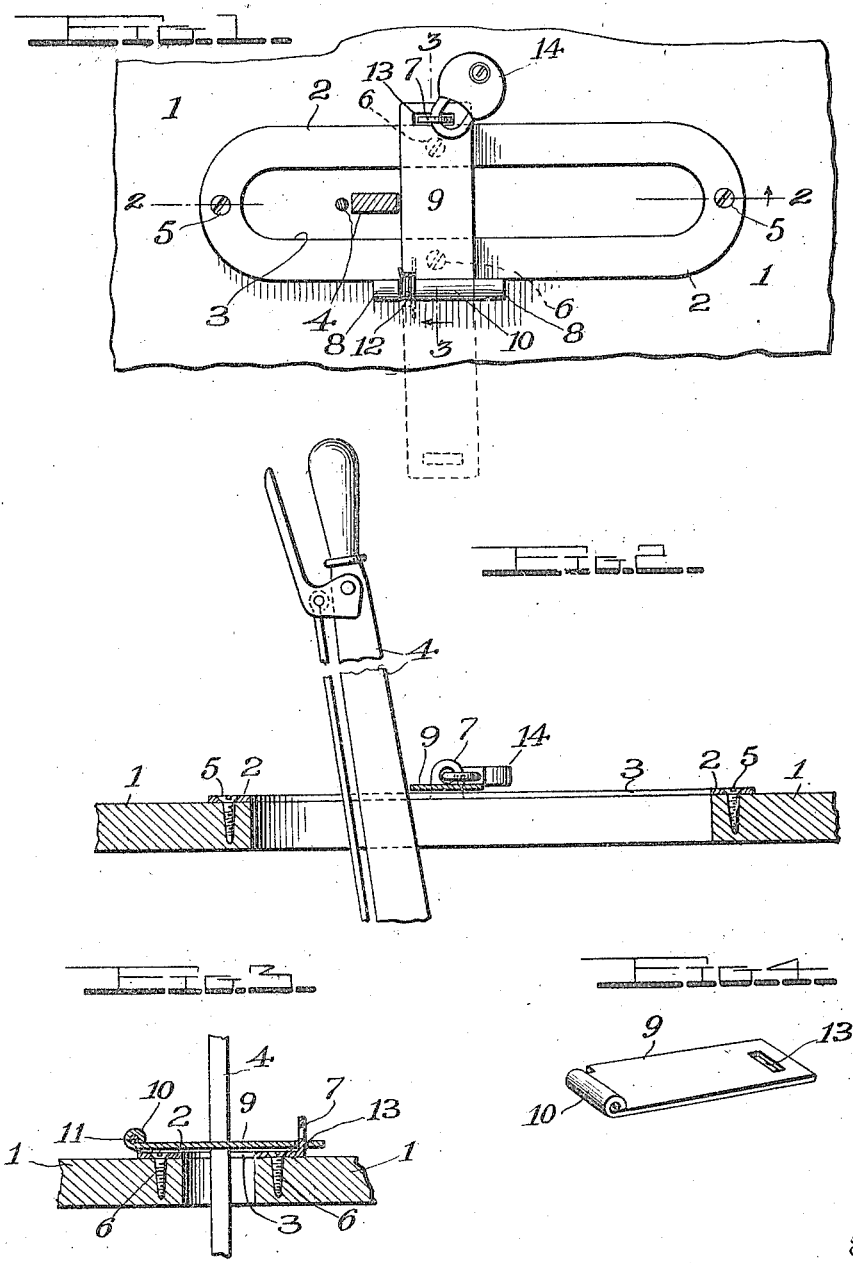
Inventor
Edward R. Hampton.
By
Attorney

UNITED STATES PATENT OFFICE.

EDWARD R. HAMPTON, OF MILFORD, CONNECTICUT.

AUTOMOBILE-EMERGENCY-BRAKE-LEVER LOCK.

1,202,382.　　　　　Specification of Letters Patent.　　Patented Oct. 24, 1916.

Application filed November 30, 1915.  Serial No. 64,217.

*To all whom it may concern:*

Be it known that I, EDWARD R. HAMPTON, a citizen of the United States, residing at the town of Milford, county of New Haven, State of Connecticut, have invented certain new and useful Improvements in Automobile-Emergency-Brake-Lever Locks; and I do declare the following to be a full, clear, and exact description of the invention, such as will enable others skilled in the art to which it appertains to make and use the same.

My invention relates to automobile emergency brake lever locks, and has for its object to provide a device of this description which is identified with the usual face plate that surrounds the elongated slot through which an emergency brake lever is operated, and furthermore to so equip this face plate with locking elements that the latter will lie close to the face plate when in locking position and will be interposed as a bar to prevent the release movement of the brake lever.

Further objects will be apparent from the detailed description of my improvement with particular reference to the accompanying drawings which form a part of this application and in which—

Figure 1 is a detail broken plan view, with the emergency brake lever in section, of my improvement as it appears when applied to the floor of an automobile body with the brake lever locked. Fig. 2 is a sectional elevation at the line 2—2 of Fig. 1. Fig. 3 is a sectional elevation at the line 3—3 of Fig. 1, and Fig. 4 is a detail perspective view of the locking hasp.

Similar numerals of reference denote like parts in the several figures of the drawing.

1 is the floor of an automobile and 2 the face plate which is provided with a long slot 3 and which is secured to the floor 1 around the usual elongated opening through which the brake lever 4 is operated, this face plate being secured by means of screws 5 at the ends and screws 6 at intermediate portions. Rising from one outside edge of the plate 2, and preferably integral therewith, is a staple 7, and extending from the opposite outside edge of said plate, and preferably integral therewith, are spaced eyes 8.

9 is a hasp having an eye 10 formed at the rear end, and this hasp is secured in position by means of a pintle 11 extending through the eyes 8 and 10, so that said hasp is in pivotal relation with respect to the plate 2. Around this pintle 11 is a short coil spring 12 whose free ends abut respectively against the hasp 9 and the face plate, and the action of this spring is such that it exerts its force to normally throw the hasp to open position so that it will be clear that the hasp is closed or swung into locking position against the resiliency of this spring.

When the hasp is swung into closed position it will engage over the staple 7 through the medium of a short slot 13 in the end of the hasp, and when the parts are thus engaged any suitable padlock 14 is applied through the staple so as to securely lock the parts in closed position.

Hasp and staple locking appliances are not broadly new as applied for the purpose of locking emergency brake levers, but heretofore all such devices have been in the nature of special parts or appliances that are entirely disassociated from the flat face plate that usually surrounds the brake lever slot in the floor of the automobile, and such devices when applied heretofore have not locked the brake lever at a point substantially on a level with the automobile floor, but have been applied at a considerable distance above the latter so that the brake lever may be readily forced so as to spring the locking device and release the brake. Also, in devices of this nature as heretofore used, it is a very simple matter to remove the parts by an ordinary wrench or screw driver so that the brake lever may be readily swung to release the brake.

In my improvement the hasp closes flat against the face plate and immediately over the intermediate screw fastenings 6, so that there is no chance whatever to spring the hasp by forcing the brake lever, while the face plate cannot be removed readily because these screws 6 are guarded by the hasp itself.

When the padlock is removed the hasp will automatically fly back to open position due to the resiliency of the spring 12.

The hasp may be operated and swung into engagement with the staple by the foot of the operator it being then merely necessary to apply the padlock.

I claim:—

A combined face plate and lock for the emergency brake lever of an automobile, comprising a flat substantially O-shaped face plate of approximately uniform thickness throughout adapted to lie substantially flush with the floor of the automobile, one side of the face plate between the ends of the slot having a contracted extension which is bent upwardly and perforated to form a staple, an eye integrally formed on the plate at a point on the other side of the slot and opposite the staple, and a hasp pivoted to the eye for swinging across the slot and lying flatly against the face of said plate for engaging over the staple, said plate having vertical screw holes and said hasp being mounted so as to swing across the plate at right angles thereto and at a point adjacent the longitudinal center of the plate.

In testimony whereof I affix my signature in presence of two witnesses.

EDWARD R. HAMPTON.

Witnesses:
 F. W. SMITH, Jr.,
 M. T. LONGDEN.